US008656266B2

(12) United States Patent
Cierniak

(10) Patent No.: US 8,656,266 B2
(45) Date of Patent: Feb. 18, 2014

(54) IDENTIFYING COMMENTS TO SHOW IN CONNECTION WITH A DOCUMENT

(75) Inventor: Michal Cierniak, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 935 days.

(21) Appl. No.: 12/338,166

(22) Filed: Dec. 18, 2008

(65) Prior Publication Data

US 2010/0162093 A1 Jun. 24, 2010

(51) Int. Cl.
G06F 17/00 (2006.01)

(52) U.S. Cl.
USPC ............................ 715/206; 715/231; 707/726

(58) Field of Classification Search
USPC ................... 705/14.6; 715/206, 231; 707/726
See application file for complete search history.

(56) References Cited

U.S. PATENT DOCUMENTS

| | | | | |
|---|---|---|---|---|
| 5,920,859 | A | * | 7/1999 | Li ................................. 715/205 |
| 6,029,195 | A | * | 2/2000 | Herz ............................. 725/116 |
| 6,282,548 | B1 | | 8/2001 | Burner et al. |
| 7,734,610 | B2 | * | 6/2010 | Rakowski et al. ............ 707/706 |
| 8,010,527 | B2 | * | 8/2011 | Denoue et al. ............... 707/726 |
| 8,095,528 | B2 | * | 1/2012 | Rakowski et al. ............ 707/706 |
| 8,117,195 | B1 | * | 2/2012 | Dave et al. .................... 707/730 |
| 8,127,220 | B1 | * | 2/2012 | Dean et al. .................... 715/206 |
| 2002/0116494 | A1 | * | 8/2002 | Kocol ............................ 709/224 |
| 2003/0208482 | A1 | * | 11/2003 | Kim et al. ......................... 707/3 |
| 2004/0255237 | A1 | * | 12/2004 | Tong ........................... 715/501.1 |
| 2005/0177805 | A1 | * | 8/2005 | Lynch et al. .................. 715/968 |
| 2005/0262050 | A1 | * | 11/2005 | Fagin et al. ....................... 707/3 |
| 2006/0004691 | A1 | * | 1/2006 | Sifry ................................. 707/1 |
| 2006/0004892 | A1 | * | 1/2006 | Lunt et al. .................... 707/204 |
| 2006/0294100 | A1 | * | 12/2006 | Meyerzon et al. ................ 707/7 |
| 2007/0143694 | A1 | | 6/2007 | Rakowski et al. |
| 2009/0006371 | A1 | * | 1/2009 | Denoue et al. ................... 707/5 |
| 2009/0248657 | A1 | * | 10/2009 | Chellapilla et al. .............. 707/5 |
| 2010/0017737 | A1 | * | 1/2010 | Berger ........................... 715/771 |
| 2011/0040787 | A1 | * | 2/2011 | Cierniak et al. ............... 707/770 |

FOREIGN PATENT DOCUMENTS

| | | |
|---|---|---|
| KR | 2003-0086840 A | 11/2003 |
| WO | WO 2006/017364 | 2/2006 |
| WO | WO 2007/056410 | 5/2007 |
| WO | WO 2007/064656 | 6/2007 |

OTHER PUBLICATIONS

Monika R. Henzinger, "Hyperlink Analysis for the Web", IEEE Internet Computing, vol. 5, No. 1, Jan. 1, 2001, pp. 45-50, XP009122911.
Notification of Transmittal of the International Search Report and the Written Opinion of the International Searching Authority, or the Declaration corresponding to PCT/US2009/068350, mailed Aug. 3, 2010, 19 pages.
http://blogrovr.com/, "BlogRovR your blogs delivered, wherever you browse", 2 pages, Oct. 31, 2008 (print date).
http://www.google.com/tools/firefox/webcomments/, "Blogger Web Comments for Firefox", 2 pages, 2007.

* cited by examiner

*Primary Examiner* — Cesar Paula
*Assistant Examiner* — Tyler J Schallhorn
(74) *Attorney, Agent, or Firm* — Harrity & Harrity, LLP

(57) ABSTRACT

A system may identify a comment that includes a number of links, each of the links points to a corresponding document; identify one or more factors associated with each of the links, the one or more factors including at least one of: a click through rate associated with the links, explicit user feedback regarding the links, a length of an address associated with the links, a measure of popularity associated with the document corresponding to the links, or a comparison of a topic associated with the comment and a topic associated with the document corresponding to the links; assign a score to the links based on the one or more factors; select one of the links based on the assigned scores; and provide information regarding the comment to a client device for presentation in connection with presentation of the document corresponding to the selected link.

30 Claims, 9 Drawing Sheets

US 8,656,266 B2

IDENTIFYING COMMENTS TO SHOW IN CONNECTION WITH A DOCUMENT

BACKGROUND

Many techniques are available to users today to find information on the world wide web ("web"). For example, users often use web browsers and/or search engines to find information of interest.

Blogs provide a form of information available on the web. A blog is a web site with entries (called posts) that contain text or other material, such as graphics or video. Blog posts may provide commentary or news on a particular subject and may contain links to web pages related or unrelated to the content of the blog posts.

A company has offered a browser plug-in that attempts to show, to a user, blog posts related to a web page that the user is currently viewing. Unfortunately, the blog posts are sometimes unrelated to the web page. Thus, the user might not find these blog posts useful.

SUMMARY

According to one implementation, a method, performed by one or more devices, may include identifying a comment that includes a number of links, each of the links pointing to a corresponding document; identifying click through rates associated with the links; selecting one of the links based on the identified click through rates; storing information that associates the comment with the document corresponding to the one link; and providing information regarding the comment to a client device for presentation in connection with presentation of the document corresponding to the one link.

According to another implementation, one or more devices may be presented. The one or more devices may include means for identifying a comment that includes a number of links, each of the links pointing to a corresponding document; means for identifying one or more factors associated with each of the links, the one or more factors including at least one of: a click through rate associated with each of the links, explicit user feedback regarding each of the links, a length of an address associated with each of the links, a measure of popularity associated with the document corresponding to each of the links, or a comparison of a topic associated with the comment and a topic associated with the document corresponding to each of the links; means for assigning a score to each of the links based on the one or more factors; means for selecting one of the links based on the assigned scores; and means for providing information regarding the comment to a client device for presentation in connection with presentation of the document corresponding to the one of the links.

According to yet another implementation, a computer-readable medium may contain instructions executable by one or more devices. The computer-readable medium may include one or more instructions to identify a comment that includes a number of links, each of the links pointing to a corresponding document; one or more instructions to identify one or more factors associated with each of the links, where the one or more factors include at least one of: a click through rate associated with each of the links, explicit user feedback regarding each of the links, a length of an address associated with each of the links, a measure of popularity associated with the document corresponding to each of the links, or a comparison of a topic associated with the comment and a topic associated with the document corresponding to each of the links; one or more instructions to select one of the links based on the one or more factors; and one or more instructions to store information that associates the comment with the document corresponding to the one of the links.

According to a further implementation, a method, performed by one or more devices, may include storing information that associates a number of comments with a particular document; identifying one or more factors associated with one of the comments, the one or more factors including at least one of: a link-based score associated with the one comment, explicit user feedback associated with the one comment, a language used within the one comment, a ranking score associated with a document from which the one comment originated, a ranking score associated with an author corresponding to the one comment, implicit user feedback associated with the one comment, or information regarding an age of the one comment; assigning a score to the one comment based on the one or more factors; selecting the one comment based on the assigned score; and providing information regarding the one comment for presentation, on a display, in connection with presentation of the particular document.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

Overview

For some documents, users might like to see other documents that comment on the contents of these documents. These "other" documents might take various forms and will be referred to herein as "comments." A comment may include any document (or a portion of a document) that provides an opinion of, or otherwise remarks upon, the contents of another document. One example of a comment may include a blog post. Another example of a comment may include a web page or a news article that remarks upon an item (e.g., a product, a service, a company, a web site, a person, a geographic location, or something else that can be remarked upon).

A "document," as the term is used herein, is to be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Figure 1:
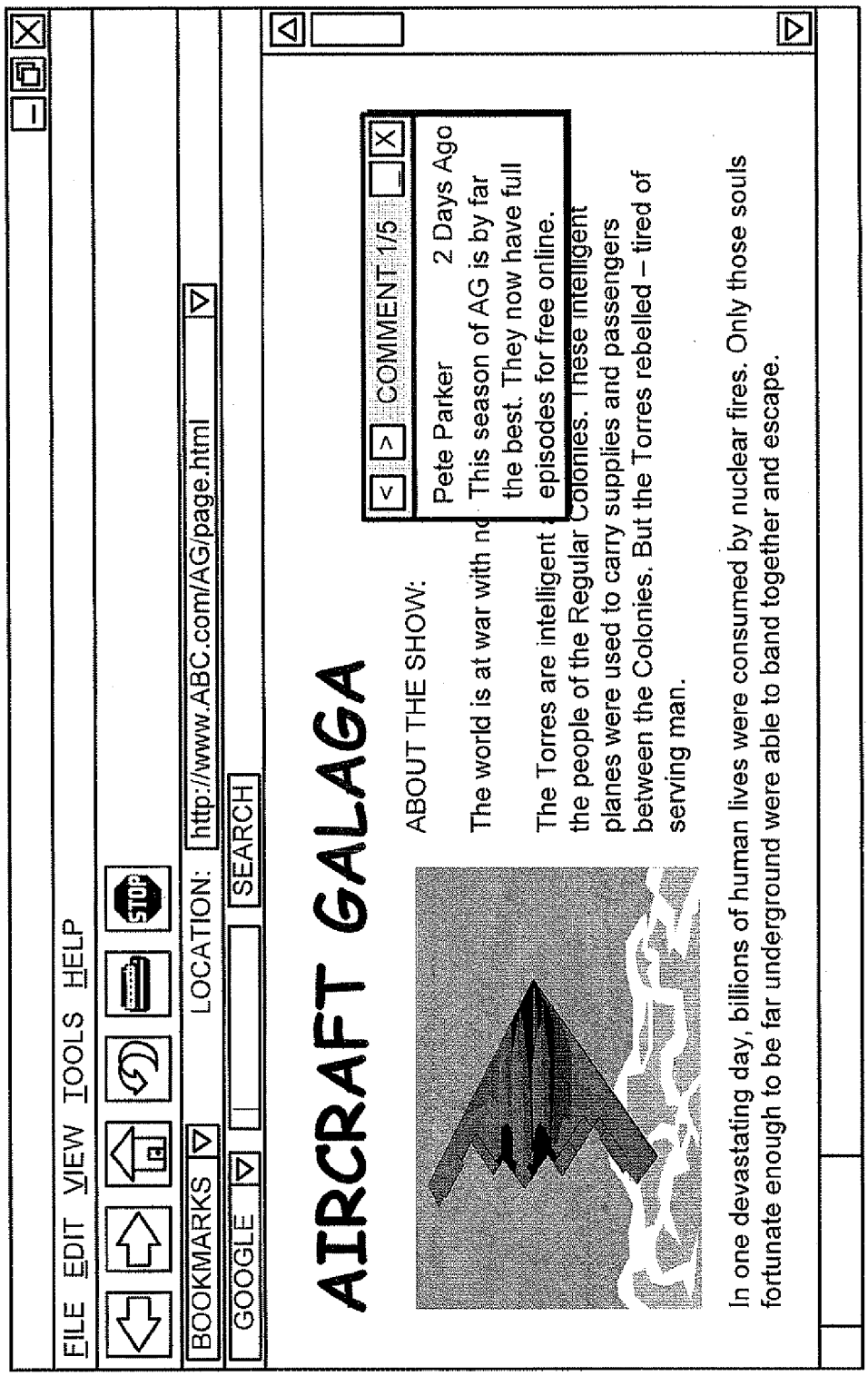
FIG. 1 is a diagram illustrating an exemplary concept described herein.

FIG. 1 is a diagram illustrating an exemplary concept described herein. As shown in FIG. 1, assume that a user requests access to a document about a television show entitled "Aircraft Galaga." To obtain access to the Aircraft Galaga document, the user might enter an address (e.g., a Uniform Resource Locator (URL)) into the address field of the user's web browser, or the user might perform a search using a search engine and select a search result corresponding to the Aircraft Galaga document. The web browser may obtain a comment that corresponds to the Aircraft Galaga document and display this comment within the web browser window. As shown in FIG. 1, the comment may be presented as a pop-up window. Alternatively, the comment may be presented within a separate frame, such as a regular frame or an inline frame (iframe).

A simple approach might be to assume that any document that links to another document is a comment that remarks upon that document. This approach is too simple to be useful because many documents are linked to by comments that are unrelated to the subject matter of the documents. Implementations described herein may provide a technique for identifying a document with which a comment is related. One technique described herein may use information regarding the click through rates of the links in a comment to identify the document with which the comment is related. This technique may operate based on the assumption that users will select a link, in a comment, that points to a document that is related to the subject matter of the comment. Another technique described herein may use a different factor, or a combination of factors, to identify the document with which a comment is related.

Exemplary Environment

Figure 2:
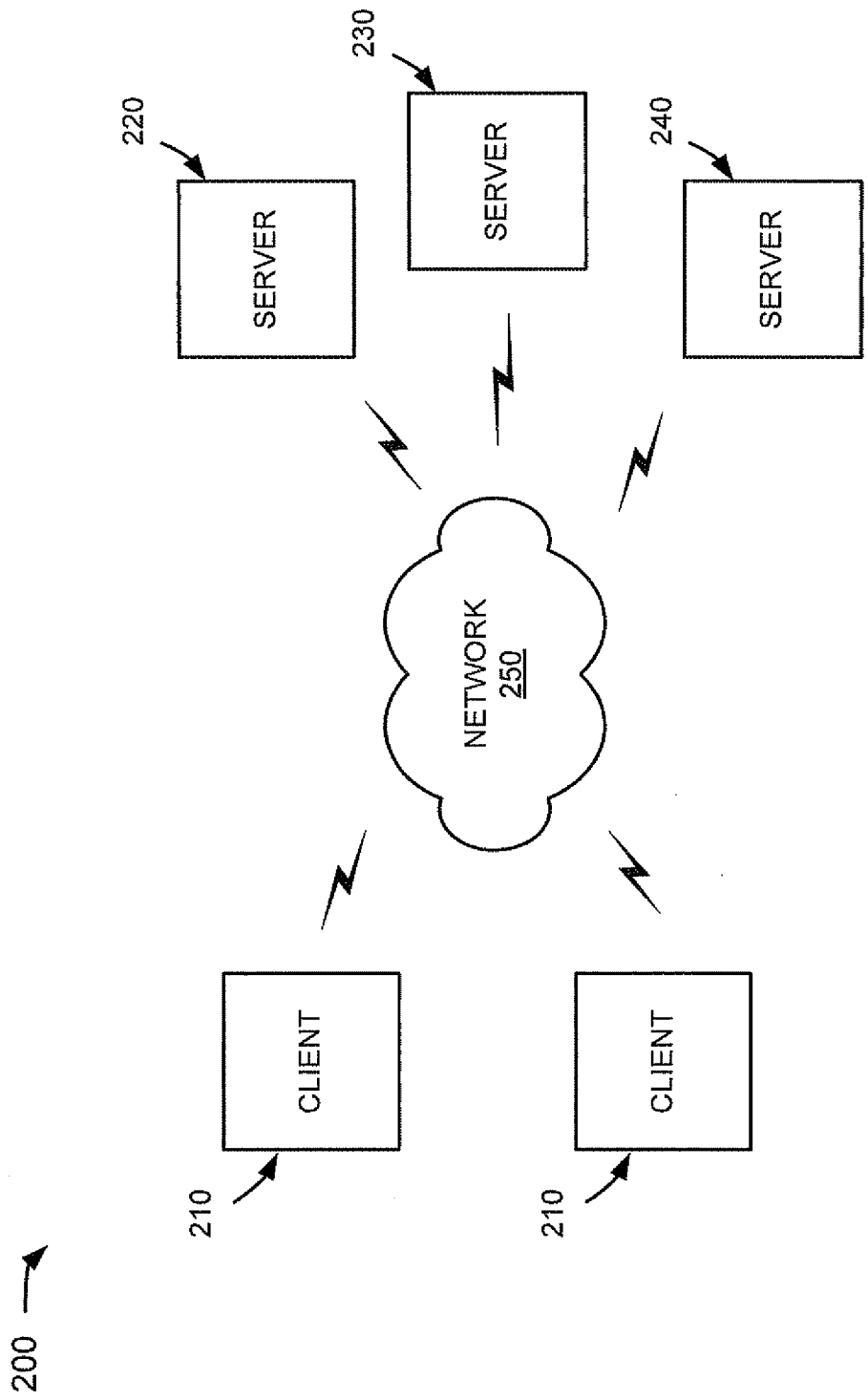
FIG. 2 is a diagram of an exemplary environment in which systems and methods described herein may be implemented.

FIG. 2 is a diagram of an exemplary environment 200 in which systems and methods described herein may be implemented. Environment 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform a function of a server and a server may perform a function of a client.

Clients 210 may include client entities. An entity may be defined as a device, such as a personal computer, a wireless telephone, a personal digital assistant (PDA), a lap top, or another type of computation or communication device, a thread or process running on one of these devices, and/or an object executed by one of these devices. In one implementation, a client 210 may include a browser that permits documents to be searched and/or accessed. Client 210 may also include software, such as a plug-in, an applet, a dynamic link library (DLL), or another executable object or process, that may operate in conjunction with (or be integrated into) the browser to obtain and display comments. Client 210 may obtain the software from server 220 or from a third party, such as a third party server, disk, tape, network, CD-ROM, etc. Alternatively, the software may be pre-installed on client 210. For the description to follow, the software will be described as integrated into the browser.

Servers 220-240 may include server entities that gather, process, search, and/or maintain documents in a manner described herein. In one implementation, server 220 may gather, process, and/or maintain comments that are associated with particular documents. Servers 230 and 240 may store or maintain comments and/or documents.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include any type of network, such as a local area network (LAN), a wide area network (WAN), a telephone network (e.g., the Public Switched Telephone Network (PSTN) or a cellular network), an intranet, the Internet, or a combination of networks. Clients 210 and servers 220-240 may connect to network 250 via wired and/or wireless connections.

Exemplary Client/Server Architecture

Figure 3:
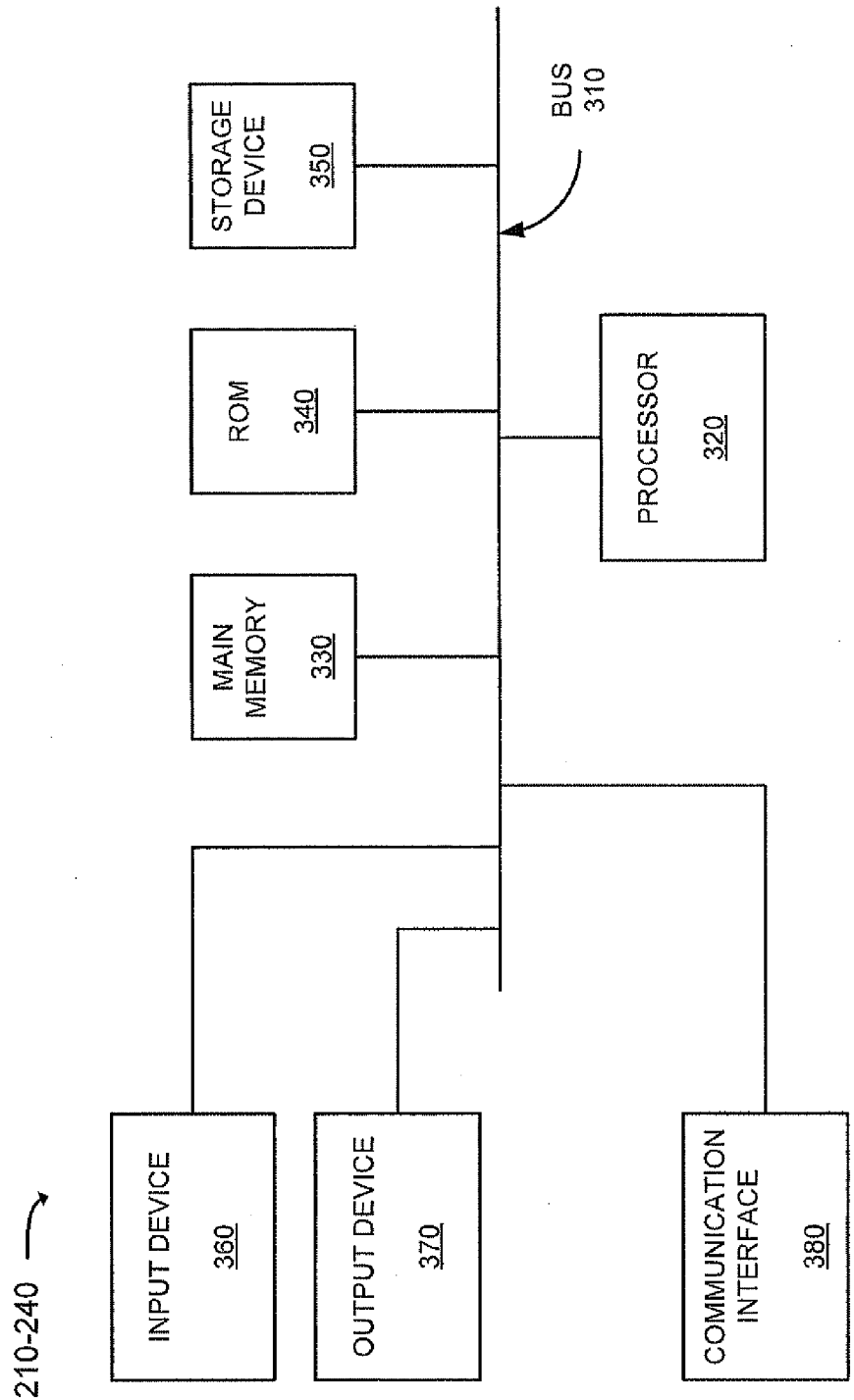
FIG. 3 is a diagram of exemplary components of a client or a server of FIG. 2.

FIG. 3 is a diagram of exemplary components of a client or server entity (hereinafter called "client/server entity"), which may correspond to one or more of clients 210 and/or servers 220-240. The client/server entity may include a bus 310, a processor 320, a main memory 330, a read only memory (ROM) 340, a storage device 350, an input device 360, an output device 370, and a communication interface 380. In another implementation, client/server entity may include additional, fewer, different, or differently arranged components than are illustrated in FIG. 3.

Bus 310 may include a path that permits communication among the components of the client/server entity. Processor 320 may include a processor, a microprocessor, or processing logic (e.g., an application specific integrated circuit (ASIC) or a field programmable gate array (FPGA)) that may interpret and execute instructions. Main memory 330 may include a random access memory (RAM) or another type of dynamic storage device that may store information and instructions for execution by processor 320. ROM 340 may include a ROM device or another type of static storage device that may store static information and instructions for use by processor 320. Storage device 350 may include a magnetic and/or optical recording medium and its corresponding drive, or a removable form of memory, such as a flash memory.

Input device 360 may include a mechanism that permits an operator to input information to the client/server entity, such as a keyboard, a mouse, a button, a pen, a touch screen, voice recognition and/or biometric mechanisms, etc. Output device 370 may include a mechanism that outputs information to the operator, including a display, a light emitting diode (LED), a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity may perform certain document processing-related operations. The client/server entity may perform these operations in response to processor 320 executing software instructions contained in a computer-readable medium, such as memory 330. A computer-readable medium may be defined as one or more memory devices.

The software instructions may be read into memory 330 from another computer-readable medium, such as storage device 350, or from another device via communication interface 380. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Associating a Comment with a Document

Figure 4:
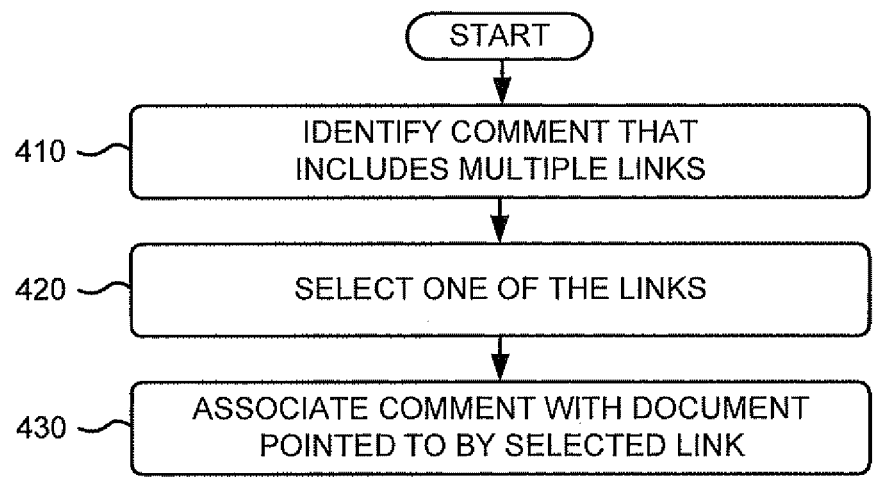
FIG. 4 is a flowchart of an exemplary process for associating a comment with a document.

FIG. 4 is a flowchart of an exemplary process for associating a comment with a document. In one implementation, the process of FIG. 4 may be performed by one or more components within server 220, client 210, or a combination of server 220 and client 210. In another implementation, the process may be performed by one or more components within another device or a group of devices separate from or including server 220 and/or client 210.

The process of FIG. 4 may begin with the identification of a comment that includes multiple links (block 410). There are many ways a comment can be identified. For example, server 220 may identify a group of documents (or a portion of the documents), that contain links, as a group of comments. In one implementation, server 220 may identify blogs or web pages (or web sites) that typically contain remarks about other documents. In this case, server 220 may operate from a group of documents that are known to typically contain remarks. For example, an operator may compile a list of web sites that contain these documents. Alternatively, server 220 may use a technique to automatically identify documents that contain remarks by, for example, looking for signals that are common for documents that contain remarks. Alternatively, server 220 may identify any document, that includes a link, as a comment. In any event, server 220 may identify a particular document (or portion of a document) as a comment. In one implementation, server 220 may parse a document to identify comments that the document contains (e.g., each paragraph may correspond to a separate comment). Server 220 may analyze the comment to identify the links that the comment includes. Those comments that include no links or contain only a single link may be discarded from the rest of the process of FIG. 4.

One of the links within the comment may be selected (block 420). The goal in this block is to select the link associated with the document about which the comment contains remarks. As explained above, a comment may include multiple links. The comment may not include remarks regarding each of the documents associated with each of the links that the comment contains. Therefore, server 220 may select one of the links corresponding to a document about which the comment may include remarks. In one implementation, server 220 may use one or more factors to select one of the links.

For example, a click through rate associated with each of the links may be used as a factor to select one of the links included in a comment. A click through rate for a link may be defined as the number of selections (e.g., clicks) that the link received divided by the number of impressions that the link received, or may be defined, more simply, as the number of selections that the link obtained. Server 220 may obtain information regarding the click through rates from several different sources that can track users' activities anonymously or with the users' express permission. For example, server 220 may obtain click through rates from an aggregator that may aggregate web feeds (e.g., Google Reader), from a browser add-on toolbar that may track a user's browser activity (e.g., Google Toolbar), from a traffic monitor that may generate statistics about visitors to web sites (e.g., Google Analytics), or from another source. In one implementation, server 220 may use information regarding the click through rates to select one of the links. When a user selects a link in a comment that user may likely select the link that points to a document that is on topic with the comment. By using the click through rates of the links to select one of the links, server 220 may select the link leading to the document with content that best matches the content of the comment.

Alternatively, or additionally, explicit user feedback may be used as a factor to select one of the links included in a comment. When a comment is presented to a user in connection with presentation of a particular document, the user may be given the opportunity to provide explicit feedback on that comment. For example, the user may indicate whether the comment is meaningful (e.g., a positive vote) or not meaningful (e.g., a negative vote) to the user (with respect to the particular document) by selecting an appropriate voting button. This kind of feedback may be used to select one of the links of the comment. If users indicate, via appropriate voting, that a comment is meaningful (or not meaningful) with regard to a particular document with which the comment is presented, this may provide evidence that the comment contains content relevant (or not relevant) to the content of the particular document. By using explicit user feedback to select one of the links, server 220 may select the link leading to the document with content that best matches the content of the comment.

Alternatively, or additionally, the length of the address (e.g., URL) associated with each of the links may be used as a factor to select one of the links included in a comment. Authors often include, within comments, links to a homepage of a company or a web site. The remarks, within a comment containing a link to a homepage, are often not about that homepage. A homepage typically includes a "short" address (e.g., an address including not much more than a domain name). Documents with longer addresses may be more useful and more likely to be on the same topic as the topic of the comment than documents with shorter addresses. In one implementation, the length of the address associated with a link may influence whether that link is selected. By using information regarding the length of the addresses of the links to select one of the links, server 220 may select the link leading to the document with content that best matches the content of the comment.

Alternatively, or additionally, statistics regarding the documents pointed to by the links (e.g., a measure of popularity of the documents, such as a link-based score of the documents) may be used as a factor to select one of the links included in a comment. Some popular documents (e.g., www.Google.com) are linked to by a lot of comments. This reduces the chances that a particular comment actually contains remarks regarding these popular documents. A popular document may be identified as a document with a measure of popularity (e.g., a link-based score) above a popularity threshold. Thus, in one implementation, the measure of popularity of a document associated with a link may influence whether that link is selected. Unpopular documents may be more useful and more likely to be on the same topic as the topic of the comment than popular documents. By using information regarding the measure of popularity of the documents pointed to by the links to select one of the links, server 220 may select the link leading to the document with content that best matches the content of the comment.

Alternatively, or additionally, topic information, which may include a comparison of the topics of the documents, pointed to by the links in a comment, to the topic of the comment, may be used as a factor to select one of the links included in the comment. The topic information may be derived using a technique that analyzes the words in a document to determine the topic(s) associated the document, analyzes the words in the comment to determine the topic(s) associated with the comment, and compares the topics to determine whether there is a match. Alternatively, the topic information may be derived using another technique. Thus, in one implementation, topic information may influence whether a link is selected. By using information, regarding a comparison of the topics of the documents pointed to by the links with the topic(s) of the comment, to select one of the links, server 220 may select the link leading to the document with content that best matches the content of the comment.

Thus, a link included in a comment may be selected as a function of one or more factors. These one or more factors may include any of the factors identified above, whether taken alone or in combination with one or more other factors. This function may be represented as: F(f1, f2, . . . , fN) (where N≥1). An example of a function that takes into account multiple ones of the factors identified above may be represented as: F(click through rate, user feedback, address length, document popularity, topic information). An example of a function that takes into account a single one of the factors identified above may be represented as: F(click through rate). In any event, the function may be used to generate a score for a link. A link may be selected based on its score (e.g., the link with the highest score may be selected for the comment).

A threshold may be used to assist in making the link selection. For example, server 220 may select the link with the highest score if the highest score exceeds the threshold. If the highest score does not exceed the threshold, server 220 may select none of the links of the comment.

Alternatively, or additionally, a threshold may be used in a different way, such as to indicate whether to process the comment at all. For example, server 220 may process the comment (e.g., to select a link) only if the scores for at least a subset of the links (or all of the links) exceed the threshold.

It may be possible for multiple links in a comment to have similar scores (e.g., scores within a certain number or percentage of each other). Thus, it may be beneficial to select a highest scoring link when the score of the highest scoring link is different enough from the score of the next-highest scoring link. In one implementation, it may be determined whether there is at least a particular gap between the score of the highest scoring link and the score of the next-highest scoring link. For example, server 220 may select the link with the highest score if there is at least the particular gap between the highest score and the next-highest score. If there is not at least the particular gap between the highest score and the next-highest score, server 220 may select none of the links of the comment.

The comment may be associated with the document pointed to by the selected link (block 430). For example, server 220 may store the comment, or information regarding the comment (e.g., an address of the comment), in memory in association with the document. In one simple implementation, an entry may be created (or updated) in a memory that identifies both the document and the comment.

While it has been described that server 220 may select one of the links in the comment, this need not be the case. In another implementation, server 220 may select more than one of the links, and may associate the comment (containing these links) with each of the documents pointed to by a corresponding one of the selected links. This might be beneficial in situations where two or more of the links in the comment obtain high scores and perhaps these scores are different enough from the scores of the next-highest scoring links (as described above).

The process of FIG. 4 may be repeated for many comments, and may be repeated periodically for previously-processed comments to update the scores and possibly the selections of the links. As a result of the process of FIG. 4, many associations between comments and documents may be created. These associations may be stored as entries in memory. For any one particular document, for example, the entry may identify one or more comments that have been associated with the particular document. A comment associated with a document may include a comment manually entered in connection with the document. For example, a graphical user interface may be presented to users in connection with a document to permit the users to provide comments about the document. These manually-entered comments may be subjected to the process of FIG. 4.

Figure 5:
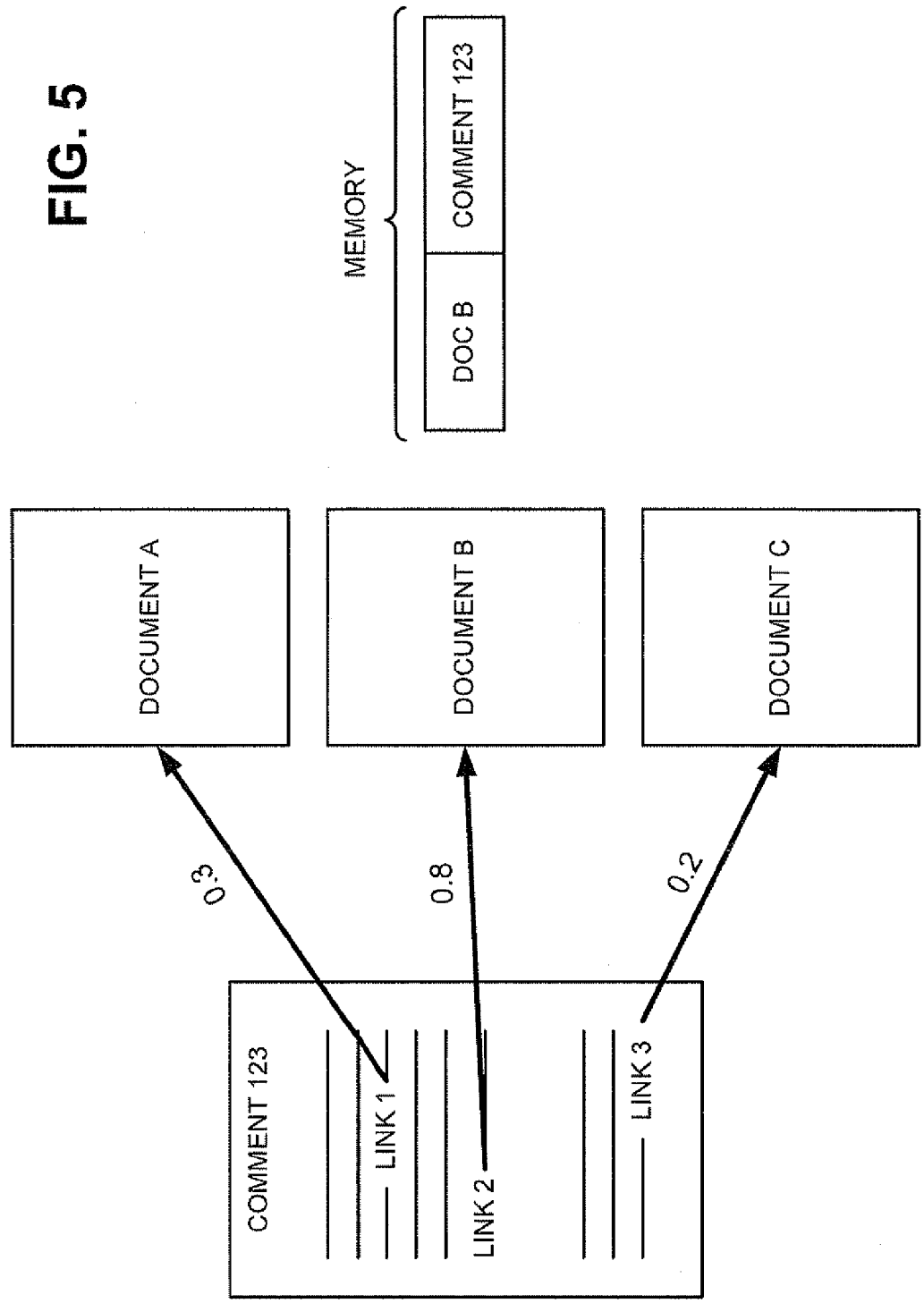
FIG. 5 is a diagram of an example of a comment with links to a number of documents.

FIG. 5 is a diagram of an example of a comment with links to a number of documents. As shown in FIG. 5, a comment (labeled as comment 123) may include a number of links (labeled as link 1, link 2, and link 3). Assume that link 1 points to document A, link 2 points to document B, and link 3 points to link C. Scores may be generated for each of the links. As shown in FIG. 5, the score for link 1 is 0.3, the score for link 2 is 0.8, and the score for link 3 is 0.2. Thus, the score for link 2 is the highest score among the links. Therefore, link 2 may be selected for comment 123. Comment 123 may be associated with document B and this association may be stored in a memory, as shown in FIG. 5. The information stored in the memory may include information that identifies document B and/or comment 123 (e.g., an identifier, such as an address at which document B and/or comment 123 is/are located), or may include some or all of the contents of document B and/or comment 123.

Selecting Comment(s) to Present with a Document

Figure 6:
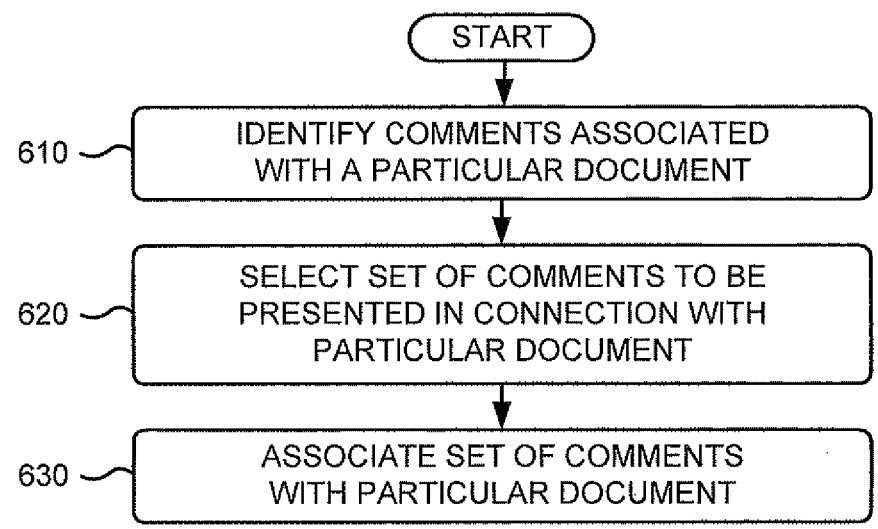
FIG. 6 is a flowchart of an exemplary process for selecting a set of comments to present with a document.

FIG. 6 is a flowchart of an exemplary process for selecting a set of comments to present with a document. In one implementation, the process of FIG. 6 may be performed by one or more components within server 220, client 210, or a combination of server 220 and client 210. In another implementation, the process may be performed by one or more components within another device or a group of devices separate from or including server 220 and/or client 210.

The process of FIG. 6 may begin with the identification of comments that are associated with a particular document (block 610). As described above, the process of FIG. 4 may result in the creation of many associations between comments and documents. These associations may be stored as entries in memory. In one implementation, server 220 may identify a particular document in the memory and identify the comments associated with that particular document.

A set of the comments, to be presented in connection with the particular document, may be selected (block 620). The set of comments may include one or more comments. The goal in this block is to select the best comment(s) to present in connection with a particular document. In one implementation, server 220 may generate a score for each of the comments and select one or more of the comments based on the generated scores. The score generated for a comment may be based on one or more factors.

In one implementation, a link-based score associated with a comment may be used as a factor to generate the score for the comment. A link-based score of a comment may be based on the number of links pointing to (or from) the comment. A comment may have its own link-based score (e.g., techniques exist for generating link-based scores for comments). Alternatively, the link-based score for a comment may be set equal to the link-based score of the document in which the comment is located. For example, a document may include multiple comments and the link-based score of the individual comments may be set equal to the link-based score of the document in which the comment is located. The link-based score of a comment may be evidence of the quality of the comment. Thus, by using the link-based score of a comment to score the comment, server 220 may assure that higher quality comments are presented in connection with the particular document.

Alternatively, or additionally, explicit user feedback may be used as a factor to generate a score for a comment. When a comment is presented to a user in connection with a document, the user may be given the opportunity to provide explicit feedback for that comment. For example, the user may indicate whether the comment is meaningful (e.g., a positive vote) or not meaningful (e.g., a negative vote) to the user (with regard to the document). This kind of explicit user feedback may be used to generate a score for the comment. For example, the number of positive votes and the number of negative votes may be counted and used as a factor in generating a score for the comment. If users indicate, via appropriate voting, that a comment is meaningful (or not meaningful) with regard to a particular document with which the comment is presented, this may provide evidence that the comment contains content relevant (or not relevant) to the content of the particular document. By using the explicit user feedback to generate a score for a comment, server 220 may assure that comments with content that best matches the content of the particular document are presented in connection with the particular document.

Alternatively, or additionally, the language used in the comment may be used as a factor to generate a score for the comment. Different language signals may be used, such as whether the comment text is in English (or a language of the user), whether proper grammar is used, whether formal words (versus slang) are used, whether proper capitalization (as opposed to all capital letters) is used, etc. One or more of these signals may be used to generate a score for the comment. For example, comments not in English, comments using improper grammar, comments using slang, and/or comments using improper capitalization may not be meaningful to a user. By analyzing the language used in a comment and using a result of this analysis to score the comment, server 220 may improve a user's experience by presenting meaningful comments in connection with the particular document.

Alternatively, or additionally, the document from which the comment originated and/or the author of the comment may be used as a factor to generate a score for the comment. Systems may exist for ranking documents that contain comments and/or authors of comments. The ranking of a document that contains a comment and/or an author of the comment may be used to generate a score for the comment. Some documents and/or authors may be known to produce high quality comments. These documents and/or authors may be ranked accordingly. By using the ranking of a document that contains a comment and/or an author of the comment to score the comment, server 220 may provide higher quality comments in connection with the particular document.

Alternatively, or additionally, implicit user feedback may be used as a factor to generate a score for a comment. For example, certain signals may reflect a user's interest or disinterest in a comment. These signals may include information regarding the amount of time that a user kept a comment open, whether the user requested the entire comment or requested access to a document containing the comment, information regarding the amount of time that a user spent accessing the comment or a document containing the comment, etc. One or more of these signals may be used to generate a score for the comment. If users indicate, via their behavior, that a comment is meaningful (or not meaningful) to them with regard to a particular document with which the comment is presented, this may provide evidence that the comment contains content relevant (or not relevant) to the content of the particular document. By using the implicit user feedback to generate a score for a comment, server 220 may assure that comments with content that best matches the content of the particular document are presented in connection with the particular document.

Alternatively, or additionally, age information may be used as a factor to generate a score for a comment. For example, the age information may include information regarding how old a comment is (e.g., with respect to a current day and/or time). The age information may be used to identify whether the comment might be considered stale or recent. A stale comment may be defined as a comment that is older than a particular threshold amount of time (e.g., older than one month). The age information may be used to generate a score for the comment. In one implementation, more recent comments may be given a higher score than less recent comments. Stale comments may not provide useful information to users. Thus, by using information regarding the age of a comment to score the comment, server 220 may improve a user's experience by presenting meaningful comments in connection with the particular document.

As explained above, server 220 may generate a score for a comment based on one or more of the factors identified above. In another implementation, yet other factors may be used alone or in combination with one or more of the factors identified above.

Server 220 may select one or more of the highest scoring comments. Alternatively, server 220 may select all comments with scores above a certain threshold. Alternatively, server 220 may use some other scheme to select one or more of the comments to include in the set of comments.

The set of comments may be associated with the particular document (block 630). For example, the association between the documents and the scores may be created or updated based on the selected comment(s). As explained above with regard to FIG. 4, comments may be associated with documents. These associations may be pared down based on the selected comment(s). Alternatively, new associations may be made (e.g., in a different memory or a different part of the same memory) based on the selected comment(s). In one simple implementation, an entry may be created (or updated) in a memory that identifies both the document and the set of comments.

The process of FIG. 6 may be repeated for many documents, and may be repeated periodically for previously-processed documents to update the scores and possibly the selections of the comments. As a result of the process of FIG. 6, many associations between comments and documents may be created or updated. These associations may be stored as entries in memory. For any one particular document, for example, the entry may identify the set of comments that have been associated with the particular document.

Figure 7:
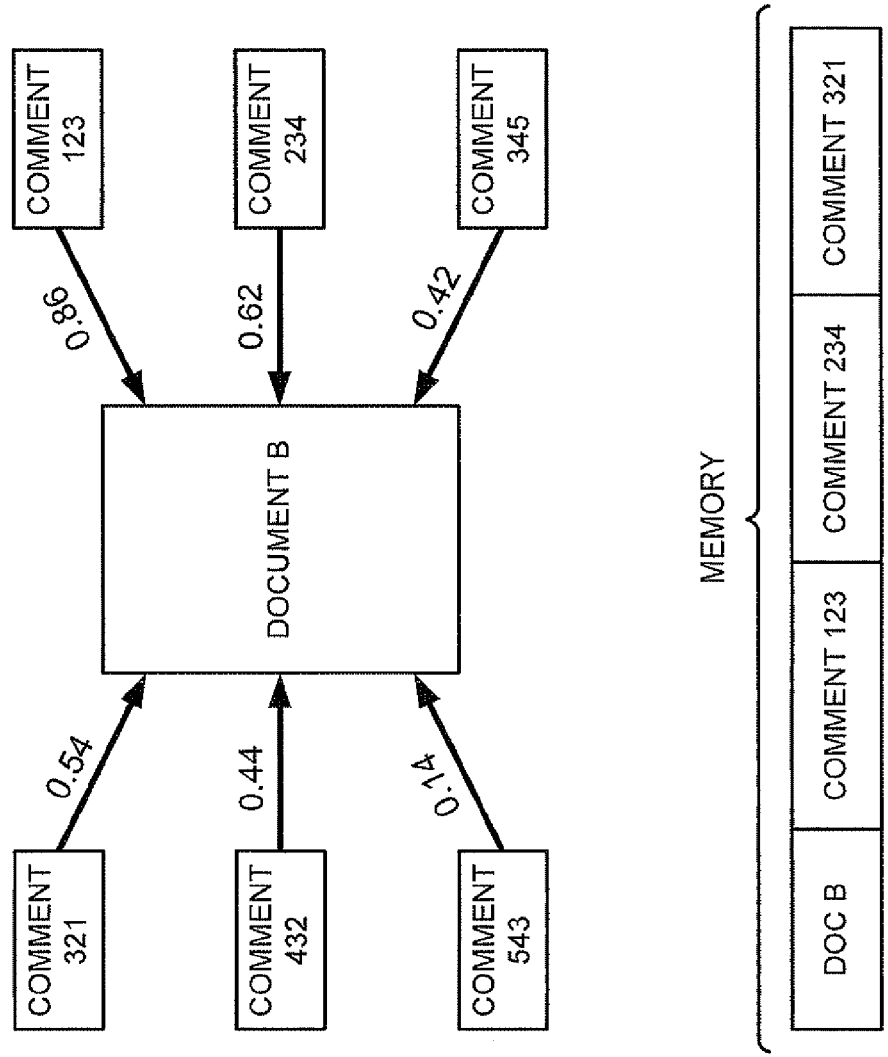
FIG. 7 is a diagram of an example of a number of comments that are associated with a document.

FIG. 7 is a diagram of an example of a number of comments that are associated with a document. As shown in FIG. 7, a document (labeled as document B) may include a number of comments (labeled as comments 123, 234, 345, 321, 432, and 543) that have been associated with document B. Scores may be generated for each of the comments. Assume that comment 123 has a score of 0.86, comment 234 has a score of 0.62, comment 345 has a score of 0.42, comment 321 has a score of 0.54, comment 432 has a score of 0.44, and comment 543 has a score of 0.14. A set of these comments may be associated with document B. For example, assume that all comments with scores over a threshold of 0.5 are selected. In this case, comments 123, 234, and 321 have scores above the threshold of 0.5. Comments 123, 234, and 321 may be associated with document B and this association may be stored in a memory, as shown in FIG. 7. The information stored in the memory may include information that identifies document B, comment 123, comment 234, and/or comment 321 (e.g., an identifier, such as an address at which document B, comment 123, comment 234, and/or comment 321 is/are located), or may include some or all of the contents of document B, comment 123, comment 234, and/or comment 321.

Presenting a Comment in Connection with a Document

Figure 8:
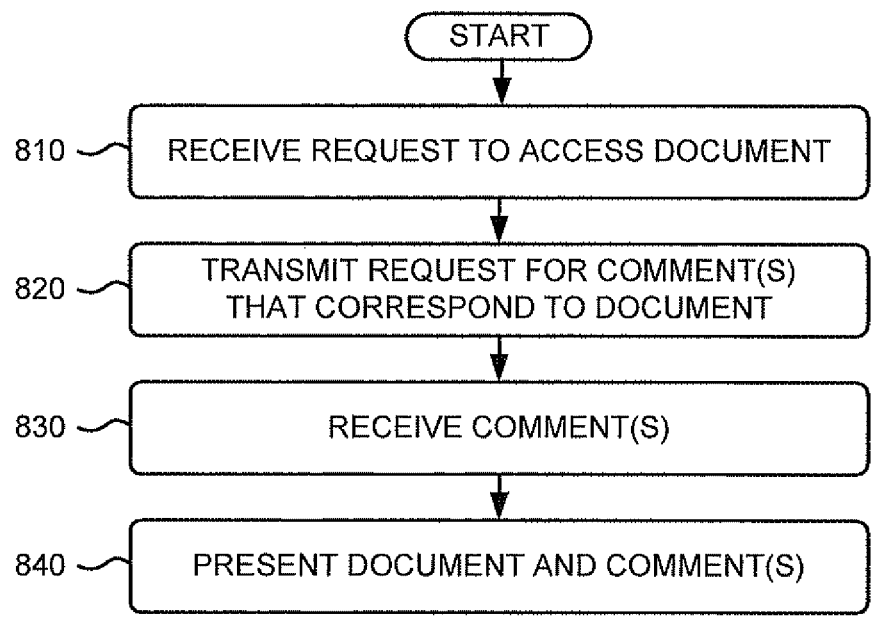
FIG. 8 is a flowchart of an exemplary process for presenting a comment in connection with a document.

FIG. 8 is a flowchart of an exemplary process for presenting a comment in connection with a document. In one implementation, the process of FIG. 8 may be performed by one or more components within client 210, server 220, or a combination of client 210 and server 220. In another implementation, the process may be performed by one or more components within another device or a group of devices separate from or including client 210 and/or server 220.

The process of FIG. 8 may begin with a request being received for accessing a document (block 810). For example, a user may initiate an application associated with a browser and use the browser to request access to a document. In one implementation, the user may request access to a document by entering an address (e.g., URL) into an address field of the browser window and instructing the browser to obtain the document. In another implementation, the user may request access to a document by entering one or more search terms into a search field of a search engine (e.g., via a web site or toolbar associated with the search engine), being presented with search results corresponding to a search performed based on the one or more search terms, and selecting one of the search results. In yet another implementation, the user may request access to a document in another way.

A request for comment(s), which correspond to the document, may be transmitted (block 820). For example, in response to the request for a document, client 210 (e.g., the browser) may generate a request for comments relating to the document and transmit the request to a server, such as server 220. In one implementation, the request may include an identifier corresponding to the document, such as a URL, and may include information that indicates that comments are desired that correspond to the document.

Server 220 may receive the request from client 210 and identify the comment(s) associated with the document. For example, server 220 may access a memory that stores associations between documents and the sets of comments that have been selected for the documents. Server 220 may access an entry in the memory and read the comment(s), associated with the document, from the entry. Server 220 may send a response back to client 210. The response may include data associated with the comment(s), such as some or all of the content of the comment(s) or a pointer to where some or all of the content of the comment(s) may be obtained.

The comment(s) may be received (block 830). For example, client 210 may receive the response from server 220. Client 210 may obtain or process (e.g., modify or format) the comment(s), based on the received response, for presentation to the user. In one implementation, client 210 may generate a comment window and insert information regarding one or more comments in the window. In another implementation, client 210 may create a frame (e.g., a regular frame or iframe) and insert information regarding one or more comments in the frame. In yet another implementation, client 210 may use another mechanism for presenting information regarding one or more comments.

The document and the comment(s) may be presented (block 840). For example, client 210 may present the document to the user via a browser window. Client 210 may also present the information regarding the one or more comments in connection with the document, such as in a window overlaid on the document or in a frame overlaid on or separate from the document. In one implementation, client 210 may present information regarding multiple comments at the same time. Alternatively, client 210 may present information regarding one of the comments at a time. In this case, client 210 may present the comments in an order based on the score of the comments (e.g., a higher scoring comment being presented before a lower scoring comment).

Figure 9:
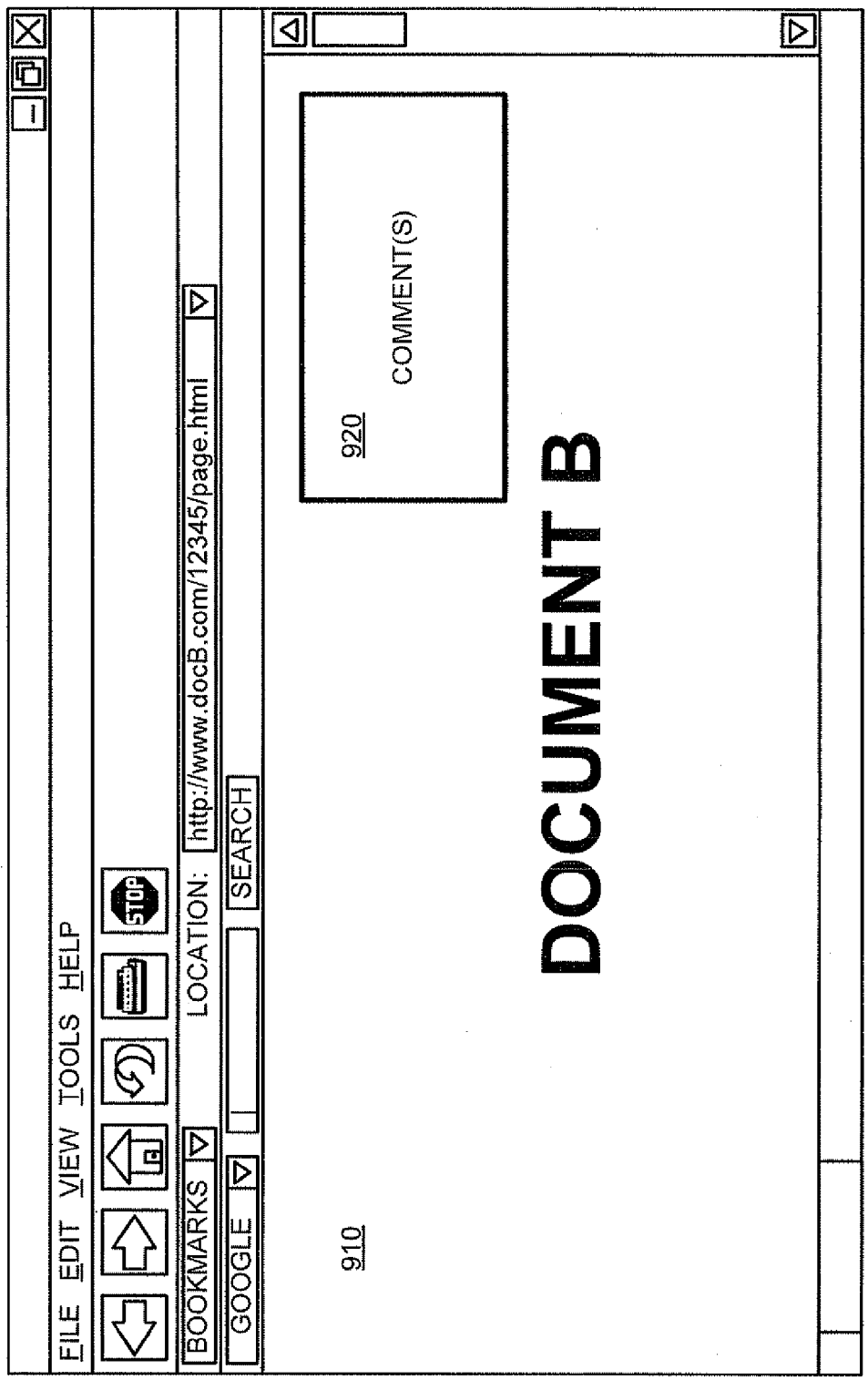
FIG. 9 is a diagram of an example of the presentation of a document and a comment.

FIG. 9 is a diagram of an example of the presentation of a document and a comment. As shown in FIG. 9, a document (labeled as document B) may be presented within a browser window 910. As further shown in FIG. 9, a comment window 920 may be presented overlaid on document B.

Figure 10:
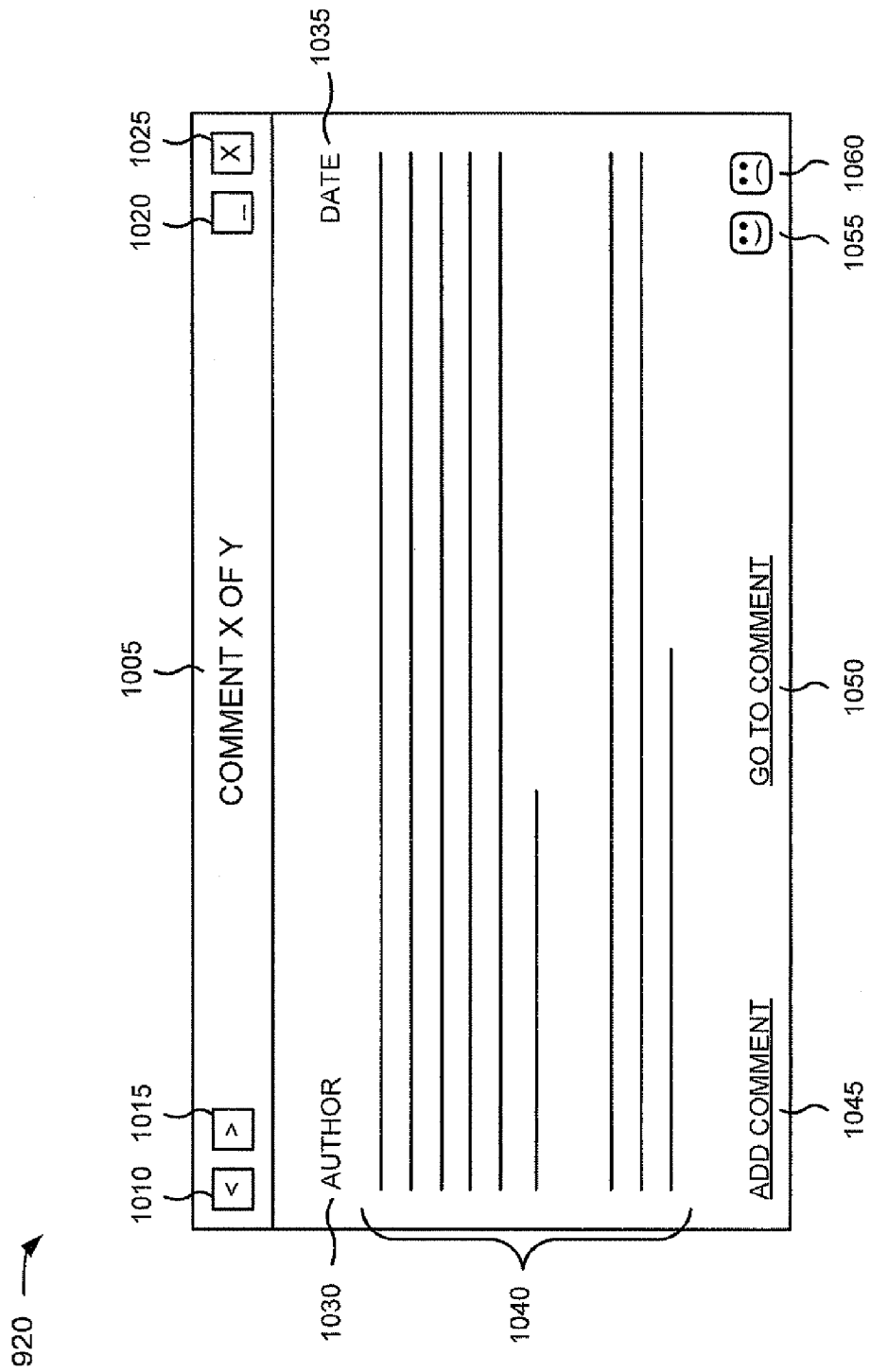
FIG. 10 is a diagram of exemplary information that may be presented within a comment window.

FIG. 10 is a diagram of exemplary information that may be presented within comment window 920. As shown in FIG. 10, comment window 920 may include a label 1005, a previous button 1010, a next button 1015, a minimize button 1020, a close button 1025, author information 1030, date information 1035, comment content 1040, an add comment link 1045, a go to comment link 1050, a positive vote button 1055, and a negative vote button 1060. In another implementation, comment window 920 may include fewer, additional, different, or differently arranged information than shown in FIG. 10.

Label 1005 may include information that identifies which comment within the set of comments is presented within comment window 920. In one exemplary implementation, label 1005 may identify the comment as X of Y, where X may identify a comment within the set of comments and Y may identify the number of comments in the set of comments. Previous button 1010 may permit the user to receive information regarding a previous comment in the set of comments. Next button 1015 may permit the user to receive information regarding a next comment in the set of comments. Minimize button 1020 may permit the user to minimize comment window 920 (e.g., reduce comment window 920 to an icon in a taskbar or the like). Close button 1025 may permit a user to close comment window 920.

Author information 1030 may include information that identifies the author of the comment. Date information 1035 may include information that identifies date information associated with the comment, such as the date on which the comment was created (or updated), or how long ago (from a current date and/or time) that the comment was created. Comment content 1040 may include all or some of the content of the comment. Comment content 1040 may include various types of data, such as text, image(s), and/or video(s).

Add comment link 1045 may permit the user to add his/her own comment regarding the document (e.g., document B). If the user selects add comment link 1045, client 210 may present the user with a user interface via which the user can provide various types of data, such as text, image(s), and/or video(s), to create a new comment. The new comment may be provided to server 220 for consideration when selecting comments to present in connection with document B. Go to comment link 1050 may permit the user to obtain the full content of the comment and/or to go to the document that contains the comment. For example, if the user selects go to comment link 1050, client 210 may cause the browser to access the document containing the comment (e.g., to access the blog containing the blog post).

Positive vote button 1055 may permit the user to provide positive feedback with respect to the comment. A user might select positive vote button 1055 when the content of the comment is relevant to the content of the document (e.g., document B). As described above, the positive feedback may be used to generate a score for the comment or a link in the comment. Negative vote button 1060 may permit the user to provide negative feedback with respect to the comment. A user might select negative vote button 1060 when the content of the comment is not relevant to the content of the document (e.g., document B). As described above, the negative feedback may be used to generate a score for the comment or a link in the comment.

Conclusion

Implementations, described herein, may select comments to provide in connection with a document. The selected comments may relate to the content of the document and, thus, provide useful information to a user who is accessing that document.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 4, 6, and 8, the order of the blocks may be modified in other implementations. Further, non-dependent blocks may be performed in parallel.

Also, certain portions of the implementations have been described as "logic" or a "component" that performs one or more functions. The terms "logic" or "component" may include hardware, such as a processor, an ASIC, or a FPGA, or a combination of hardware and software (e.g., software running on a general purpose processor).

Further, it has been described that scores are generated for links and/or comments. The scoring scheme has been described where higher scores are better than lower scores. This need not be the case. In another implementation, the scoring scheme may be switched to one in which lower scores are better than higher scores.

Certain factors have been described for selecting a link in a comment. In another implementation, an author may embed information reflecting the author's intent regarding a link in a comment. Information regarding the author's intent may include information that the author of the comment may embed in the code of the comment (e.g., in a "rel" attribute of the anchor tag) to indicate the intent of the author with respect to a particular link. For example, the author may embed information that indicates that a particular link in a comment is associated with a document about which the comment remarks. The author's intent may be used to select a link with or without the other factors described above.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method performed by one or more devices, the method comprising:
identifying, by the one or more devices, a group of comments;
determining, by the one or more devices, that a first comment, of the group of comments, does not include a plurality of links pointing to a plurality of different documents;
removing, by the one or more devices, the first comment from the group of comments based on the first comment not including the plurality of links pointing to the plurality of different documents;
identifying, by the one or more devices, a second comment, of the group of comments, that includes:
a first link pointing to a first document, and
a second link pointing to a second document that is different from the first document;
identifying, by the one or more devices and based on the second comment including the first link pointing to the first document and the second link pointing to the second document, a first click through rate associated with the first link and a second click through rate associated with the second link;
determining, by the one or more devices, that a content of the second comment is more closely related to a content of the first document than to a content of the second document based on the first click through rate and the second click through rate;
determining, by the one or more devices, to associate the second comment with the first document and not to associate the second comment with the second document based on the content of the second comment being more closely related to the content of the first document than to the content of the second document;
storing, by the one or more devices, information that associates the second comment with the first document; and
providing, by the one or more devices, information regarding the second comment to a client device for presentation in connection with presentation of the first document.

2. The method of claim 1, further comprising:
identifying a plurality of comments associated with the first document,
where the second comment is one of the plurality of comments; and
selecting one or more of the plurality of comments to present in connection with the presentation of the first document.

3. The method of claim 2, where selecting one or more of the plurality of comments includes:
analyzing a language used within one of the plurality of comments,
assigning a score to the one of the plurality of comments based on the language used in the one of the plurality of comments, and
selecting the one of the plurality of comments based on the assigned score.

4. The method of claim 2, where selecting one or more of the plurality of comments includes:
identifying a ranking score associated with a document from which one of the plurality of comments originated,
assigning a score to the one of the plurality of comments based on the ranking score associated with the document from which the one of the plurality of the comments originated, and
selecting the one of the plurality of comments based on the assigned score.

5. The method of claim 2, where selecting one or more of the plurality of comments includes:
identifying a ranking score associated with an author corresponding to one of the plurality of comments,
assigning a score to the one of the plurality of comments based on the ranking score associated with the author corresponding to one of the plurality of comments, and
selecting the one of the plurality of comments based on the assigned score.

6. The method of claim 2, where selecting one or more of the plurality of comments includes:
obtaining implicit user feedback associated with one of the plurality of comments,
assigning a score to the one of the plurality of comments based on the implicit user feedback associated with the one of the plurality of the comments, and
selecting the one of the plurality of comments based on the assigned score.

7. The method of claim 2, where selecting one or more of the plurality of comments includes:
obtaining information regarding an age of one of the plurality of comments,
assigning a score to the one of the plurality of comments based on the age of the one of the plurality of the comments, and
selecting the one of the plurality of comments based on the assigned score.

8. The method of claim 2, further comprising:
storing information that associates the one or more of the plurality of comments with the first document.

9. The method of claim 8, where providing the information regarding the second comment to the client device includes providing information regarding the one or more of the plurality of comments to the client device for presentation in connection with the presentation of the first document.

10. The method of claim 1, further comprising:
identifying a link-based score associated with each of a plurality of comments associated with the first document,
the plurality of comments including the second comment,
assigning a score to each of the plurality of comments based on the associated link-based score, and
selecting the second comment from the plurality of comments based on assigning the score; and
where providing the information regarding the second comment includes:
providing the information regarding the second comment based on selecting the second comment from the plurality of comments.

11. The method of claim 1, further comprising:
obtaining explicit user feedback associated with the second comment; and
where determining that the content of the second comment is more closely related to the content of the first document than to the content of the second document includes:
determining that the content of the second comment is more closely related to the content of the first document than to the content of the second document further based on the explicit user feedback.

12. One or more devices, comprising:
means for identifying a group of comments;
means for determining that a first comment, of the group of comments, does not include a plurality of links pointing to a plurality of different documents;
means for removing the first comment from the group of comments based on the first comment not including the plurality of links pointing to the plurality of different documents;
means for identifying a second comment that includes:
a first link pointing to a first document, and
a second link pointing to a second document that is different than the first document;
means for identifying one or more factors associated with the first link,
the one or more factors associated with the first link including at least one of:
a click through rate associated with the first link,
explicit user feedback regarding the first link,
a length of an address associated with the first link,
a measure of popularity associated with the first document, or
a comparison of a topic associated with the second comment and a topic associated with the first document;
means for identifying one or more factors associated with the second link,
the one or more factors associated with the second link including at least one of:
a click through rate associated with the second link,
explicit user feedback regarding the second link, a length of an address associated with the second link,
a measure of popularity associated with the second document, or
a comparison of the topic associated with the second comment and a topic associated with the second document;
means for assigning a score to the first link based on the one or more factors associated with the first link;
means for assigning a score to the second link based on the one or more factors associated with the second link;
means for associating the second comment with one of the first document or the second document based on the score assigned to the first link and the score assigned to the second link,
the second comment being associated with the first document when the score assigned to the first link is greater than the score assigned to the second link, and
the second comment being associated with the second document when the score assigned to the second link is greater than the score assigned to the first link; and
means for providing information regarding the second comment to a client device for presentation in connection with presentation of the first document or the second document,
the information regarding the second comment being provided in connection with the first document when the second comment is associated with the first document, and
the information regarding the second comment being provided in connection with the second document when the second comment is associated with the second document.

13. The one or more devices of claim 12, further comprising:
means for storing information that associates the second comment with the first document when the second comment is associated with the first document and information that associates the second comment with the second document when the second comment is associated with the second document.

14. The one or more devices of claim 12, where the second comment is associated with the first document, the method further comprising:
means for identifying a plurality of comments associated with the first document, where the second comment is one of the plurality of comments; and
means for selecting one or more of the plurality of comments to present in connection with the presentation of the first document.

15. The one or more devices of claim 14, where the means for selecting the one or more of the plurality of comments includes:
means for assigning a score to one of the plurality of comments based on at least one of:
a link-based score associated with the one of the plurality of comments,
explicit user feedback associated with the one of the plurality of comments,
a language used within the one of the plurality of comments,
a ranking score associated with a document from which the one of the plurality of comments originated,
a ranking score associated with an author corresponding to the one of the plurality of comments,
implicit user feedback associated with the one of the plurality of comments, or
information regarding an age of the one of the plurality of comments, and means for selecting the one of the plurality of comments based on the assigned score.

16. The one or more devices of claim 12, where the means for providing the information regarding the second comment to the client device includes:
means for receiving, from the client device, a request for comments, and
means for providing, to the client device, the information regarding the second comment based on the received request.

17. A non-transitory computer-readable medium containing instructions executable by one or more devices, the instructions comprising:
one or more instructions that, when executed by the one or more devices, cause the one or more devices to:
identify a group of comments;
determine that a first comment, of the group of comments, does not include a plurality of links pointing to a plurality of different documents;
remove the first comment from the group of comments based on the first comment not including the plurality of links pointing to the plurality of different documents;
identify a second comment that includes the plurality of links,
the plurality of links including:
a first link pointing to a first document, and
a second link pointing to a second document that is different from the first document;
identify one or more factors associated with the first link,
where the one or more factors associated with the first link include at least one of:
a click through rate associated with the first link,
explicit user feedback regarding the first link,
a length of an address associated with the first link,
a measure of popularity associated with the first document, or
a comparison of a topic associated with the second comment and a topic associated with the first document;
identify one or more factors associated with the second link,
where the one or more factors associated with the second link include at least one of:
a click through rate associated with the second link,
explicit user feedback associated with the second link,
a length of an address associated with the second link,
a measure of popularity associated with the second document, or
a comparison of the topic associated with the second comment and a topic associated with the second document;
determine that the second comment is more relevant to the first document than to the second document based on the one or more factors associated with the first link;
associate the second comment with the first link based on the second comment being more relevant to the first document than to the second document;
determine not to associate the second comment with the second link based on the second comment being more relevant to the first document than to the second document; and store information that associates the second comment with the first document.

18. The non-transitory computer-readable medium of claim 17, where the one or more factors associated with the first link include the click through rate associated with the first link; and
   where the one or more instructions to determine to associate the second comment with the first document include one or more instructions to determine to associate the second comment with the first document based on the click through rate associated with the first link.

19. The non-transitory computer-readable medium of claim 17, where the one or more factors associated with the first link include the explicit user feedback regarding the first link; and
   where the one or more instructions to determine to associate the second comment with the first document include one or more instructions to determine to associate the second comment with the first document based on the explicit user feedback regarding the first link.

20. The non-transitory computer-readable medium of claim 17, where the one or more factors include the length of the address associated with the first link; and
   where the one or more instructions to determine to associate the second comment with the first document include one or more instructions to determine to associate the second comment with the first document based on the length of the address associated with the first link.

21. The non-transitory computer-readable medium of claim 17, where the one or more factors associated with the first link include the measure of popularity associated with the first document; and
   where the one or more instructions to determine that the second comment is more relevant to the first document than to the second document include:
      one or more instructions to determine that the second comment is more relevant to the first document than to the second document based on the measure of popularity associated with the first document.

22. The non-transitory computer-readable medium of claim 17, where the one or more factors associated with the first link include the comparison of the topic associated with the second comment and the topic associated with the first document; and
   where the one or more instructions to determine to associate the second comment with the first document include:
      one or more instructions to identify the topic associated with the second comment,
      one or more instructions to identify the topic associated with the first document,
      one or more instructions to compare the topic associated with the second comment with the topic associated with the first document, and
      one or more instructions to determine to associate the second comment with the first document based on a result of the comparison of the topic associated with the second comment with the topic associated with the first document.

23. A method performed by one or more devices, the method comprising:
   identifying, by the one or more devices, a plurality of comments;
   determining, by the one or more devices, that a first comment, of the plurality of comments, does not include a plurality of links pointing to a plurality of different documents;
   removing, by the one or more devices and based on the first comment not including the plurality of links pointing to the plurality of different documents, the first comment from the plurality of comments to form a group of comments;
   identifying, by the one or more devices, a second comment, of the group of comments, that includes a first link to a first document and a second link to a second document that is different than the first document;
   determining, by the one or more devices, that the second comment is more relevant to the first document than the second comment is to the second document;
   determining, by the one or more devices, to associate the second comment with the first document and to not associate the second comment with the second document based on determining that the second comment is more relevant to the first document than the second comment is to the second document;
   storing information that associates the group of comments with the first document;
   identifying one or more factors associated with one comment of the group of comments,
      the one or more factors including at least one of:
         a link-based score associated with the one comment of the group of comments,
         explicit user feedback associated with the one comment of the group of comments,
         a language used within the one comment of the group of comments,
         a ranking score associated with a document from which the one comment of the group of comments originated,
         a ranking score associated with an author corresponding to the one comment of the group of comments,
         implicit user feedback associated with the one comment of the group of comments, or
         information regarding an age of the one comment of the group of comments;
   assigning a score to the one comment of the group of comments based on the one or more factors;
   selecting the one comment of the group of comments based on the assigned score; and
   providing information regarding the one comment of the group of comments for presentation, on a display, in connection with presentation of the first document.

24. The method of claim 23, where the one or more factors include the link-based score associated with the one comment of the group of comments; and
   where assigning the score to the one comment of the group of comments includes assigning the score to the one comment of the group of comments based on the associated link-based score.

25. The method of claim 23, where the one or more factors include the explicit user feedback associated with the one comment of the group of comments; and
   where assigning the score to the one comment of the group of comments includes assigning the score to the one comment of the group of comments based on the associated explicit user feedback.

26. The method of claim 23, where the one or more factors include the language used within the one comment of the group of comments; and
   where assigning the score to the one comment of the group of comments includes assigning the score to the one comment of the group of comments based on the language used in the one comment of the group of comments.

27. The method of claim 23, where the one or more factors include the ranking score associated with the document from which one comment of the group of comments originated; and where assigning the score to the one comment of the group of comments includes assigning the score to the one comment of the group of comments based on the ranking score associated with the document from which the one comment of the group of the comments originated.

28. The method of claim 23, where the one or more factors include the ranking score associated with the author associated with the one comment of the group of comments; and where assigning the score to the one comment of the group of comments includes assigning the score to the one comment of the group of comments based on the ranking score associated with the author associated with one comment of the group of comments.

29. The method of claim 23, where the one or more factors include the implicit user feedback associated with the one comment of the group of comments; and where assigning the score to the one comment of the group of comments includes assigning the score to the one comment of the group of comments based on the implicit user feedback associated with the one comment of the group of the comments.

30. The method of claim 23, where the one or more factors include the information regarding the age of the one comment of the group of comments; and where assigning the score to the one comment of the group of comments includes assigning the score to the one comment of the group of comments based on the age of the one comment of the group of the comments.

* * * * *